United States Patent
Kim

(10) Patent No.: US 9,454,226 B2
(45) Date of Patent: Sep. 27, 2016

(54) APPARATUS AND METHOD FOR TRACKING GAZE OF GLASSES WEARER

(71) Applicant: HYUNDAI MOTOR COMPANY, Seoul (KR)

(72) Inventor: Seon A Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/599,175

(22) Filed: Jan. 16, 2015

(65) Prior Publication Data

US 2016/0103485 A1 Apr. 14, 2016

(30) Foreign Application Priority Data

Oct. 10, 2014 (KR) .................. 10-2014-0136644

(51) Int. Cl.
G06F 3/01 (2006.01)
G06T 7/00 (2006.01)
G06K 9/00 (2006.01)

(52) U.S. Cl.
CPC ........... *G06F 3/013* (2013.01); *G06K 9/00281* (2013.01); *G06K 9/00604* (2013.01); *G06T 7/004* (2013.01); *G06T 7/0085* (2013.01); *G06T 2207/10012* (2013.01); *G06T 2207/30201* (2013.01); *G06T 2207/30241* (2013.01)

(58) Field of Classification Search
None
See application file for complete search history.

(56) References Cited

U.S. PATENT DOCUMENTS

| 9,230,180 B2* | 1/2016 | Zhang ............... G06K 9/00845 |
| 2008/0285801 A1* | 11/2008 | Heinzmann ........ G06K 9/00281 382/103 |
| 2010/0033333 A1* | 2/2010 | Victor .................... A61B 3/113 340/576 |
| 2013/0285901 A1 | 10/2013 | Lee et al. |

FOREIGN PATENT DOCUMENTS

| JP | 2000-067225 A | 3/2000 |
| JP | 2008-146356 A | 6/2008 |
| JP | 2010-244156 A | 10/2010 |
| KR | 10-1286965 B1 | 7/2013 |
| KR | 10-2013-0121303 A | 11/2013 |
| KR | 10-2014-0037730 A | 3/2014 |

* cited by examiner

*Primary Examiner* — David F Dunphy
(74) *Attorney, Agent, or Firm* — McDermott Will & Emery LLP

(57) ABSTRACT

An apparatus for tracking a gaze of a glasses wearer simultaneously captures at least two face images by a camera, extracts glasses feature points when glasses are present within the face images by confirming whether the glasses are present within the captured face images, and calculates a gaze vector based on the extracted glasses feature points.

12 Claims, 3 Drawing Sheets

APPARATUS AND METHOD FOR TRACKING GAZE OF GLASSES WEARER

CROSS-REFERENCE TO RELATED APPLICATION

This application is based on and claims the benefit of priority to Korean Patent Application No. 10-2014-0136644, filed on Oct. 10, 2014 in the Korean Intellectual Property Office, the disclosure of which is incurporated herein in its entirety by reference.

TECHNICAL FIELD

The present disclosure relates to an apparatus and a method for tracking a gaze, and more particularly, to an apparatus and a method for tracking a gaze of a glasses wearer capable of tracking a gaze of a glasses wearer.

BACKGROUND OF THE INVENTION

A system for tracking a gaze predicts a gaze direction by analyzing a movement of eyes. Generally, the system for tracking a gaze analyzes an eye image of a user photographed by a camera to calculate a gaze.

The system for tracking a gaze tracks a gaze using position information of glint from which lighting is reflected based on an image obtained by photographing lighting once reflected on a cornea by the camera. In this case, when a user wears glasses, a phenomenon that lens reflection light due to lighting formed on a glasses lens hides a user's pupil or hides reflected light formed on the pupil occurs. As such, when the lighting reflection light formed on the glasses lens hides the user's pupil or hides the reflected light formed on the pupil, errors occur at the time of calculating a gaze position.

As described above, the typical method for tracking a gaze is difficult to accurately detect a gaze direction of a glasses wearer as compared with those who are not wearing glasses. Therefore, the related art detects all the feature points (eye, nose, mouth, and the like) of a face to calculate a face direction. However, since a human face is not perfectly plane but stereoscopic, errors occur at the time of calculating a face direction based on the face feature points.

SUMMARY OF THE INVENTION

The present disclosure has been made to solve the above-mentioned problems occurring in the prior art while advantages achieved by the prior art are maintained intact.

An aspect of the present disclosure provides an apparatus and a method for tracking a gaze of a glasses wearer capable of tracking a user's gaze using only glasses feature points within a face image captured by a camera when a user is a glasses wearer.

According to an exemplary embodiment of the present invention, a method for tracking a gaze of a glasses wearer includes: simultaneously capturing at least two face images by a camera; after the capturing of the at least two face images, confirming whether glasses are present within each of the face images; extracting glasses feature points from the corresponding face images when glasses are present within each of the face images; and calculating a gaze vector based on the glasses feature points.

The camera may be implemented as a stereo camera or a multi camera.

In the extracting of the glasses feature points, the glasses may be detected from each of the face images and then the glasses feature points may be extracted by an edge detection.

The calculating of the gaze vector may include: calculating three-dimensional coordinates of each of the glasses feature points by matching the glasses feature points extracted from each of the at least two face images, respectively; calculating an equation of a glasses plane based on the three-dimensional coordinates of the glasses feature points; and estimating the gaze vector by calculating a normal vector of the glasses plane.

In the calculating of the plane equation, plane equations for each of the left and right glasses lenses may be obtained.

The estimating of the normal vector may include: calculating normal vectors vertical to the left and right glasses planes, respectively; and calculating a midpoint between the two normal vectors as a gaze vector.

According to another exemplary embodiment of the present invention, an apparatus for tracking a gaze of a glasses wearer includes: a camera configured to simultaneously capture at least two face images; a feature point extractor configured to extract glasses feature points from the face images captured by the camera; a calculator configured to calculate a gaze vector based on the glasses feature points; and a controller configured to control an operation of each of the components.

The camera may be implemented as a stereo camera or a multi camera.

The feature point extractor may detect glasses from each of the face images captured by the camera and then extract the glasses feature points.

The feature point extractor may extract the glasses feature points based on an edge detection.

The calculator may match the glasses feature points extracted from each of the at least two face images, respectively, to calculate three-dimensional coordinates of each of the glasses feature points.

The calculator may calculate equations of glasses planes for each of the left and right glasses lenses based on the three-dimensional coordinates of the glasses feature points.

The calculator may calculate normal vectors vertical to the left and right glasses planes of the glasses and calculate a midpoint between the two normal vectors as the gaze vector.

BRIEF DESCRIPTION OF THE DRAWINGS

The above and other objects, features and advantages of the present disclosure will be more apparent from the following detailed description taken in conjunction with the accompanying drawings, where.

DETAILED DESCRIPTION OF THE INVENTION

Hereinafter, exemplary embodiments of the present invention will be described with reference to the accompanying drawings.

In the present specification, unless explicitly described to the contrary, "comprising" any components will be understood to imply the inclusion of other components rather than the exclusion of any other elements.

Further, the term "part", "-er, -or", "module", or the like, described in the specification means a unit of processing at least one function or operation and may be implemented by hardware, software or a combination of hardware and software. Further, unless mentioned in the present specification otherwise or clearly refuted by a context in a context describing the present disclosure, an article such as "a, an", "one", "the", or the like may be used as a meaning including both of a singular number and a plural number.

Unlike the feature points of a curved face, according to an exemplary embodiment of the present invention, a gaze direction vector is accurately calculated by using the features that most of the glasses take a plane form and edges of glasses are not sharply bent.

Figure 1:
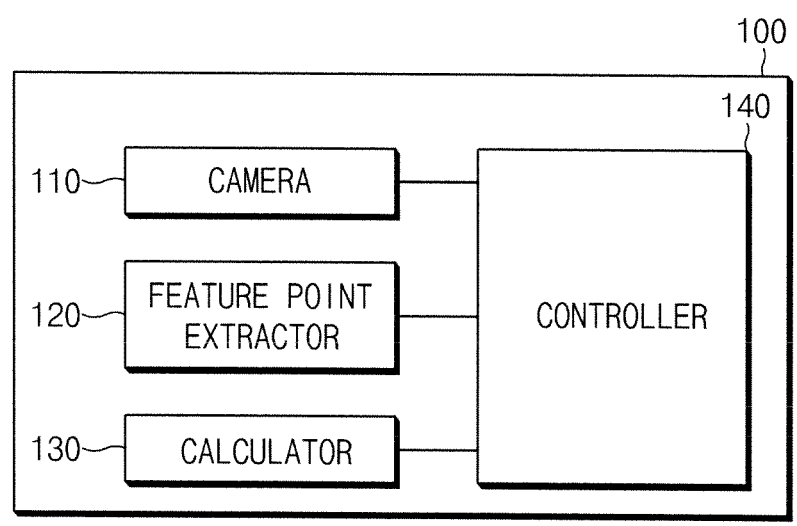
FIG. 1 is a block configuration diagram illustrating an apparatus for tracking a gaze of a glasses wearer according to an exemplary embodiment of the present invention.
Figure 2:
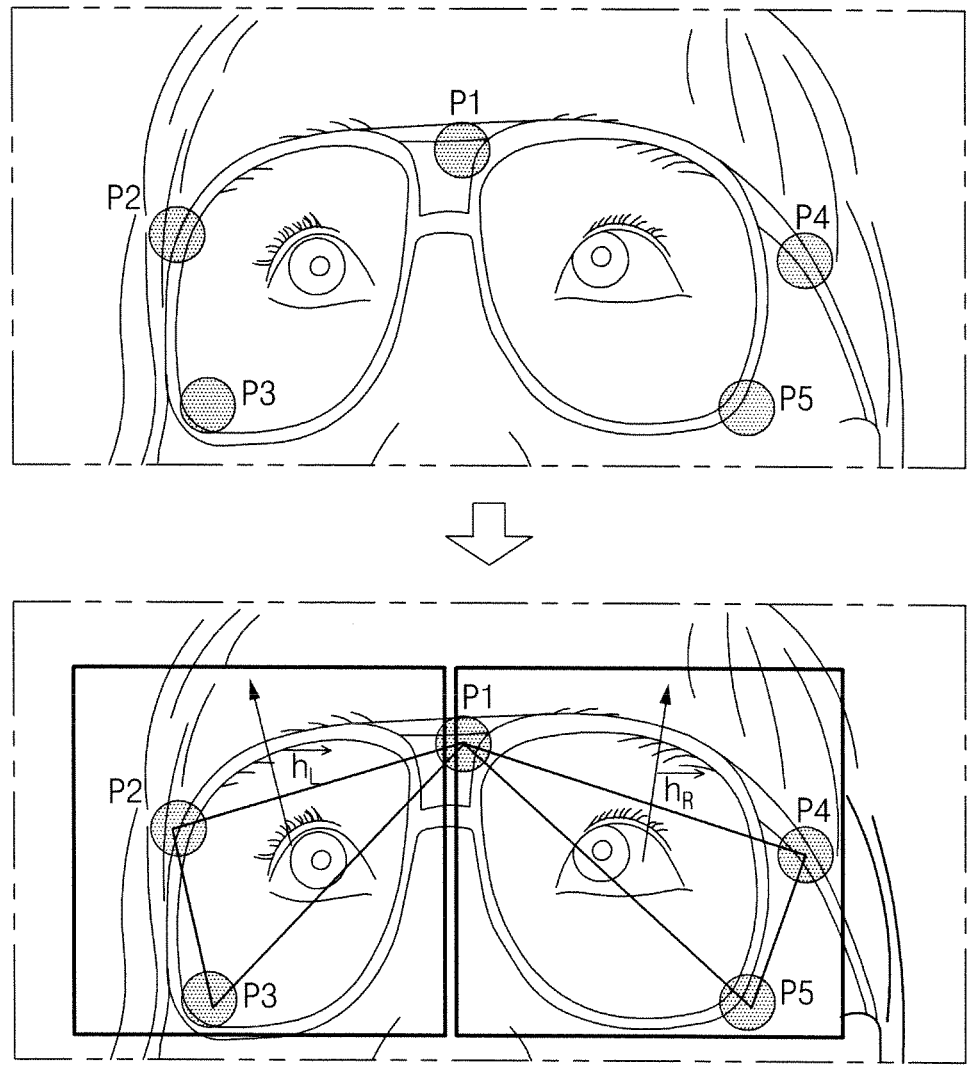
FIG. 2 is a diagram illustrating a process of tracking a gaze according to an exemplary embodiment of the present invention.

FIG. 1 is a block configuration diagram illustrating an apparatus for tracking a gaze of a glasses wearer according to an exemplary embodiment of the present invention and FIG. 2 is a diagram illustrating a process of tracking a gaze according to an exemplary embodiment of the present invention.

Referring to FIG. 1, an apparatus 100 for tracking a gaze according to an exemplary embodiment of the present invention includes a camera 110, a feature point extractor 120, a calculator 130, and a controller 140.

The camera 110 is equipped in a cluster of a vehicle to capture a face image of a user (for example: driver). The exemplary embodiment of the present invention illustrates as an example the case in which the camera 110 is equipped in a cluster of a vehicle but is not limited thereto, and therefore the camera may be installed anywhere in front of a user so as to direct toward the user's face.

The camera 110 may be implemented as a stereo camera or a multi camera. The camera 110 may simultaneously capture at least two face images photographed at different positions.

The feature point extractor 120 confirms whether glasses are present within the face image captured by the camera 110. In other words, the feature point extractor 120 uses a known glasses detection algorithm such as an active appearance model (AAM) to detect the glasses from the face image and thus confirm whether the user wears the glasses. The feature point extractor 120 extracts glasses feature points (frame of glasses) from the corresponding face image when the glasses are present within the face image.

The feature point extractor 120 uses an edge detection method such as sobel and canny to extract the glasses feature point from the face image.

The calculator 130 matches the respective glasses feature points extracted from at least two face images simultaneously captured by the camera 110 to calculate three-dimensional (3D) coordinates (positions) of the respective glasses feature points. The calculator 130 calculates depth information based on camera calibration and matching of stereo images. For example, the calculator 130 calculates three-dimensional coordinates of the glasses feature points based on camera parameters and an OpenCV triangulatePoints function.

The calculator 130 calculates an equation of a glasses plane based on the three-dimensional glasses feature points. As illustrated in FIG. 2, the equations (plane equations) of the glasses plane which is formed of the three-dimensional glasses feature points P1, P2, and P3 and the glasses plane which is formed of the glasses feature points P1, P4, and P5 are calculated. An equation of a plane vertical to vector $\vec{h}=(a,b,c)$ may be represented by the following Equation 1.

$$ax+by+cz+d=0 \quad \text{[Equation 1]}$$

Further, the calculator 130 calculates the plane equation based on a RANdom SAmple Consensus (RANSAC) algorithm, and the like when many glasses feature points are obtained.

After the calculator 130 calculates the plane equation, a normal vector n: (a, b, c) of the glasses plane becomes a face direction vector. As illustrated in FIG. 2, the calculator 130 calculates normal vectors $\vec{h}_L$, and $\vec{h}_R$ vertical to the left and right glasses lenses (glasses plane) and then corrects a midpoint between the two vectors as a gaze direction vector.

Unlike the related art of calculating the face direction by detecting face feature points of eye, nose, mouth, and the like, the exemplary embodiment of the present disclosure uses the plane of the glasses itself to calculate the face direction in the case of the glasses wearer, and therefore may correct the gaze direction vector when the gaze tracking using the face feature points fails.

Further, the exemplary embodiment of the present invention uses only the glasses feature points and the plane equation and therefore may perform a fast calculation.

Figure 3:
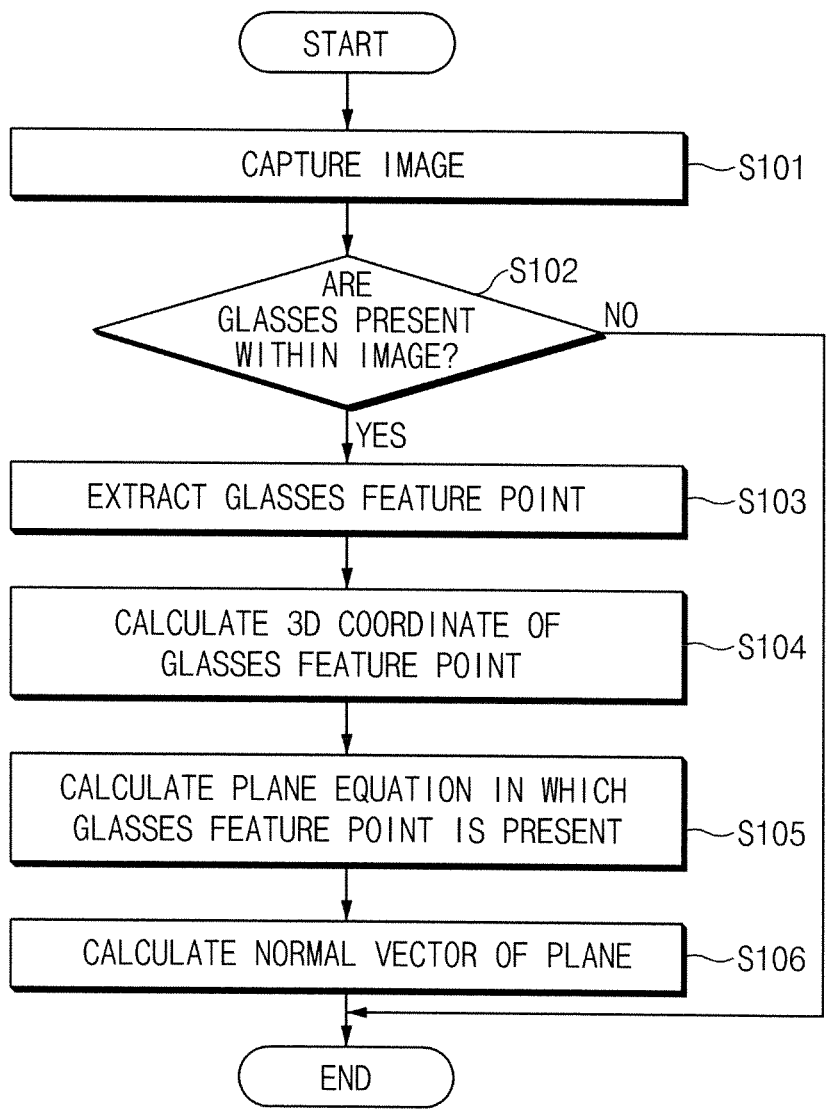
FIG. 3 is a flow chart illustrating a method for tracking a gaze of a glasses wearer according to an exemplary embodiment of the present invention.

FIG. 3 is a flow chart illustrating a method for tracking a gaze of a glasses wearer according to an exemplary embodiment of the present invention.

The apparatus 100 for tracking a gaze simultaneously captures at least two face images using the camera 110 (S101).

The apparatus 100 for tracking a gaze confirms whether the glasses are present within each of the captured face images (S102). In other words, the apparatus 100 for tracking a gaze confirms whether the user is a glasses wearer. In this case, the apparatus 100 for tracking a gaze detects glasses from each of the face images based on the glasses detection algorithm and extracts the detected glasses feature points.

The apparatus 100 for tracking a gaze extracts the glasses feature points from the face image when glasses are present within the face image (S103).

The apparatus 100 for tracking a gaze uses the extracted glasses feature points to calculate the gaze direction (vector) (S104 to S106).

Next, a process of calculating a gaze direction will be described in more detail.

The calculator 130 of the apparatus 100 for tracking a gaze matches the glasses feature points extracted from each of the at least two face images which are simultaneously captured and then calculates the three-dimensional coordinates (positions) of the glasses feature points (S104).

The calculator 130 uses the three-dimensional coordinates of the glasses feature points to calculate the plane equation (S105). That is, the calculator 130 calculates the three-dimensional coordinates of the glasses feature points to calculate the glasses plane.

The calculator 130 calculates the normal vector based on the plane equation (S106). In other words, the calculator 130 calculates the normal vector vertical to the glasses plane and uses the calculated normal vector as the face direction vector (gaze direction).

The above-mentioned exemplary embodiments are implemented by combining the components and the features of the present disclosure in a predetermined form. Each component or feature should be considered as being selective unless being explicitly described separately. Each component or feature may be practiced in a form in which it is not combined with other components or features. Further, the exemplary embodiments of the present invention may be configured by combining some components and/or features. An order of the operations described in the exemplary embodiments of the present invention may be changed. Some components or features of any of the exemplary embodiments may be included in other exemplary embodiments or may be replaced by the corresponding components or features of other exemplary embodiments. It is apparent that the exemplary embodiments may be configured by combining claims which do not have an explicitly cited relation in claims and may be included in new claims which are amended after filing.

The exemplary embodiments of the present invention may be implemented by, for example, hardware, firmware, software, a combination thereof, or the like. In the case of the implementation by the hardware, the exemplary embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of the implementation by the firmware or the software, the exemplary embodiments of the present invention may be implemented by a form of modules, procedures, functions, or the like, that perform functions or operations described above. Software codes are stored in a memory unit and may be driven by a processor. The memory unit is disposed inside or outside the processor and may transmit and receive data to and from the processor by the well-known various means.

According to the exemplary embodiments of the present invention, it is possible to increase the accuracy of the user's gaze tracking and reduce the computation burden since the user's gaze is tracked by calculating the face direction based on the glasses feature points within the face image captured by the camera when the user wears the glasses.

Further, according to the exemplary embodiments of the present invention, it is possible to easily track the gaze based on the smaller feature points than the related art using the face feature points when the face direction is calculated using the glasses feature points since the glasses are not stereoscopic but plane.

It is apparent to those skilled in the art that the exemplary embodiments of the present invention may be embodied in other specific forms without departing from features of the present disclosure. Therefore, the foregoing detailed description is not to be restrictively construed in all aspects but should be reckoned as being exemplary. The scope of the present disclosure is to be determined by a reasonable interpretation of the appending claims and all the changes within an equivalent range of the present disclosure are included in the scope of the present disclosure.

What is claimed is:

1. A method for tracking a gaze of a glasses wearer, comprising steps of:
    simultaneously capturing at least two face images by a camera;
    confirming whether glasses are present within each of the at least two face images;
    extracting glasses feature points from the corresponding face images upon confirmation of presence of the glasses within each of the face images; and
    calculating a gaze vector based on plane equations for each of the left and right glasses lenses calculated using the glasses feature points.

2. The method according to claim 1, wherein the camera is implemented as a stereo camera or a multi camera.

3. The method according to claim 1, wherein in the step of extracting the glasses feature points, the glasses are detected from each of the face images and then the glasses feature points are extracted by an edge detection.

4. The method according to claim 1, wherein the step of calculating the gaze vector includes:
    calculating three-dimensional coordinates of each of the glasses feature points by matching the glasses feature points extracted from each of the at least two face images, respectively;
    calculating an equation of a glasses plane based on the three-dimensional coordinates of the glasses feature points; and
    estimating the gaze vector by calculating a normal vector of the glasses plane.

5. The method according to claim 4, wherein the step of estimating the normal vector includes:
    calculating the normal vectors vertical to left and right glasses planes, respectively; and
    calculating a midpoint between the two normal vectors as a gaze vector.

6. An apparatus for tracking a gaze of a glasses wearer, comprising:
    a camera configured to simultaneously capture at least two face images;
    a processor configured to:
    extract glasses feature points from the at least two face images captured by the camera;
    calculate a gaze vector based on plane equations for each of the left and right glasses lenses calculated using the glasses feature points; and
    control an operation of the camera, the feature point extractor, and the calculator.

7. The apparatus according to claim 6, wherein the camera is implemented as a stereo camera or a multi camera.

8. The apparatus according to claim 6, wherein the processor detects glasses from each of the face images captured by the camera and then extracts the glasses feature points.

9. The apparatus according to claim 6, wherein the processor extracts the glasses feature points based on an edge detection.

10. The apparatus according to claim 6, wherein the processor matches the glasses feature points extracted from each of the at least two face images, respectively, to calculate three-dimensional coordinates of each of the glasses feature points.

11. The apparatus according to claim 10, wherein the processor calculates equations of glasses planes for each of the left and right glasses lenses based on the three-dimensional coordinates of the glasses feature points.

12. The apparatus according to claim 11, wherein the processor calculates normal vectors vertical to left and right glasses planes of glasses and calculates a midpoint between the two normal vectors as the gaze vector.

* * * * *